(12) United States Patent
Kanesan et al.

(10) Patent No.: US 10,003,133 B2
(45) Date of Patent: Jun. 19, 2018

(54) REUSABLE CARRIER BASED POLARIZATION DIVERSITY FOR UPLINK OF FULL-DUPLEX RADIO-OVER-FIBER SYSTEM

(71) Applicant: Telekom Malaysia Berhad, Kuala Lumpur (MY)

(72) Inventors: Thavamaran Kanesan, Seremban (MY); Farha Binti Maskuriy, Kapar (MY); Mohd Azmi Bin Ismail, Sungai Buloh (MY); Mohd Hafiz Bin Mohamad Nor, Johor Bahru (MY); Hizamel Bin Mohd Hizan, Petaling Jaya (MY); Romli Bin Mohamad, Kajang (MY); Sufian Mousa Ibrahim Mitani, Kuala Lumpur (MY)

(73) Assignee: Telekom Malaysia Berhad, Kuala Lumpur (MY)

( * ) Notice: Subject to any disclaimer, the term of this patent is extended or adjusted under 35 U.S.C. 154(b) by 155 days.

(21) Appl. No.: 15/279,842

(22) Filed: Sep. 29, 2016

(65) Prior Publication Data
US 2017/0214151 A1    Jul. 27, 2017

(30) Foreign Application Priority Data
Jan. 22, 2016    (MY) .............................. PI2016000131

(51) Int. Cl.
*H04B 10/25*        (2013.01)
*H04B 10/2575*      (2013.01)
(Continued)

(52) U.S. Cl.
CPC ........... *H01Q 21/24* (2013.01); *H01Q 1/2291* (2013.01); *H01Q 5/22* (2015.01); *H04L 5/14* (2013.01);
(Continued)

(58) Field of Classification Search
CPC ........ H01Q 21/24; H01Q 5/22; H01Q 1/2291; H04L 5/14; H04W 72/0413; H04W 72/042
(Continued)

(56) References Cited

U.S. PATENT DOCUMENTS 5,408,350 A  *  4/1995  Perrier ............... H04B 10/2587
                                                          398/168
5,504,606 A  *  4/1996  Frigo ................. H04B 10/2587
                                                            398/1
(Continued)

FOREIGN PATENT DOCUMENTS

EP          2 485 418 A1    8/2012

OTHER PUBLICATIONS

Jianxin et al, CN101742738A, Jun. 2010, pages All Document.*

*Primary Examiner* — Ken N Vanderpuye
*Assistant Examiner* — Dibson Sanchez
(74) *Attorney, Agent, or Firm* — McCarter & English, LLP

(57) ABSTRACT

The present invention discloses a system for full-duplex data transmission using polarization multiplexing comprises a central station having a first means for processing downlink signals and a second means for processing uplink signals, and a remote antenna unit connected to the central station via a transmission medium, having a third means for processing downlink signals and a fourth means for processing uplink signals, characterised in that the remote antenna unit is configured to receive downlink signals from the central station, and then to split a portion of the downlink signals to be used as uplink data transmission simultaneously with transmission of the downlink.

21 Claims, 8 Drawing Sheets

(51) Int. Cl.
  *H04B 10/50* (2013.01)
  *H04B 10/60* (2013.01)
  *H04J 14/06* (2006.01)
  *H01Q 21/24* (2006.01)
  *H04L 5/14* (2006.01)
  *H04W 72/04* (2009.01)
  *H01Q 1/22* (2006.01)
  *H01Q 5/22* (2015.01)

(52) U.S. Cl.
  CPC ..... *H04W 72/042* (2013.01); *H04W 72/0413* (2013.01)

(58) Field of Classification Search
  USPC .......... 398/65, 115–116, 140–172, 182–201, 398/202–214
  See application file for complete search history.

(56) References Cited

U.S. PATENT DOCUMENTS

| | | | | |
|---|---|---|---|---|
| 5,559,624 A * | 9/1996 | Darcie | ................. | H04B 10/071 398/167.5 |
| 5,710,648 A * | 1/1998 | Frigo | ................. | H04B 10/2587 398/108 |
| 5,886,803 A * | 3/1999 | Yamamoto | ........... | H04B 10/272 398/168 |
| 5,905,586 A * | 5/1999 | Even | ....................... | H04J 14/02 398/1 |
| 6,118,565 A * | 9/2000 | Frigo | ................. | H04B 10/2587 398/1 |
| 6,580,535 B1 | 6/2003 | Schonfelder | | |
| 7,349,634 B2 * | 3/2008 | Sasai | ............... | H04B 10/25753 398/115 |
| 7,389,048 B2 * | 6/2008 | Kani | .................. | H04J 14/0226 398/100 |
| 8,032,025 B2 | 10/2011 | Ibragimov et al. | | |
| 8,064,544 B2 * | 11/2011 | Li | ....................... | H04B 10/677 398/115 |
| 8,135,287 B2 * | 3/2012 | Yu | ...................... | H04B 10/5165 398/182 |
| 8,184,973 B2 * | 5/2012 | Qian | ..................... | H04B 10/61 398/202 |
| 8,208,811 B2 * | 6/2012 | Xia | ........................ | H04B 10/40 398/155 |
| 8,538,263 B2 * | 9/2013 | Ogasahara | ............. | H04J 14/06 398/147 |
| 2005/0123298 A1 * | 6/2005 | Kim | ................... | H04B 10/2587 398/70 |
| 2005/0265727 A1 * | 12/2005 | Glingener | ............... | H04J 14/06 398/152 |
| 2007/0147273 A1 * | 6/2007 | Lee | .................. | H04B 10/25758 370/280 |
| 2010/0067902 A1 * | 3/2010 | Sun | .................... | H04B 10/0799 398/25 |
| 2010/0209114 A1 * | 8/2010 | Gloeckner | ......... | H04B 10/2587 398/141 |
| 2011/0026932 A1 * | 2/2011 | Yeh | .................. | H04B 10/25759 398/116 |
| 2011/0150503 A1 * | 6/2011 | Winzer | .................. | H04B 10/60 398/202 |
| 2011/0229149 A1 * | 9/2011 | Grubb | .................. | H04B 10/506 398/188 |
| 2012/0039606 A1 * | 2/2012 | Grigoryan | .......... | H04B 10/5053 398/65 |
| 2012/0051756 A1 * | 3/2012 | Grobe | ............... | H04B 10/5161 398/184 |
| 2014/0126916 A1 * | 5/2014 | Ota | .................... | H04B 10/2569 398/152 |
| 2015/0086216 A1 * | 3/2015 | Xie | ....................... | H04B 10/54 398/186 |
| 2015/0132008 A1 * | 5/2015 | Kuo | .................. | H04B 10/803 398/135 |
| 2015/0162986 A1 * | 6/2015 | Campos | ................ | H04B 10/27 398/70 |
| 2016/0036533 A1 * | 2/2016 | Nakashima | ........... | G02F 1/0123 398/187 |
| 2016/0099776 A1 * | 4/2016 | Nakashima | ...... | H04B 10/50572 398/186 |
| 2016/0337041 A1 * | 11/2016 | Wen | ........................ | H04J 14/06 |
| 2017/0353248 A1 * | 12/2017 | Booman | ................. | H04B 10/532 |

* cited by examiner

REUSABLE CARRIER BASED POLARIZATION DIVERSITY FOR UPLINK OF FULL-DUPLEX RADIO-OVER-FIBER SYSTEM

CROSS-REFERENCE TO RELATED APPLICATIONS

The present application claims the priority benefit of Malaysian Patent Application No. PI 2016000131, filed Jan. 22, 2016, which is incorporated by reference in its entirety.

FIELD OF INVENTION

The invention relates to a reusing optical carrier in uplink transmission for multiple services of radio-over-fiber communication using polarization multiplexing technique.

BACKGROUND OF THE INVENTION

Radio-over-fiber (RoF) refers to a technology whereby light is modulated by a radio signal and transmitted over an optical fiber link to a remote antenna unit for facilitating wireless access. In a conventional ROF network, an optical transmitter converts radio signals into optical signals and transmits the optical signals through the optical fibers. At the other end of the optical fibers, an optical receiver is provided to convert the optical signals into radio signals. The drawbacks of the conventional remote antenna unit are as follows.
1. Complexity of remote antenna unit (RAU): Complexity of RAU leads to increase in cost and power usage.
2. Capacity of optical fiber is not fully utilised: The conventional system does not utilise all bandwidth of the optical fiber as it uses separate fiber or different wavelength in uplink and downlink data transmission.
3. Different fiber cables for downlink and uplink transmission: in practise, separate fibers or different wavelength are used for downlink and uplink to avoid interference. However, this also leads to increase in cost and power usage.
4. Signal collision: When multiple services are transmitting in a single system, there are possibilities that the signals will collide or interfere with each other.

Therefore, a need exists for the RAU to be designed with reduced components and less complexity due to multiple numbers of to be deployed at the residential or commercial area. The invention provides an economical and effective RAU system that implements a reuse carrier technique for full-duplex data transmission.

PRIOR ART

EP 2485418 A1 discloses a polarization multiplexing system specifically on sending and receiving method of modulation and demodulation of polarized multiplexing signal. It claims particularly on the receiving apparatus for optical polarization division multiplexing so as to reduce cross talk in optical signals at a receiving, between x-polarization and y-polarization. This patent focuses on the mechanism to precisely de-multiplex the received polarized multiplexing signal. However, it is not related to full-duplex multiplexing system using a reused local multipoint distribution system (LMDS) carrier.

U.S. Pat. No. 6,580,535 B1 discloses using two optical signals with same wavelength are polarization filtered at a sending end and multiplexed into orthogonal polarization orientations of a fiber. This polarization multiplexed signal is transmitted via optical data link (fiber) and to a receiving end having a splitter. However, this is only a half-duplex polarization multiplexing system and uses controller to control the polarization of the signals. It is not related to full-duplex multiplexing system using a reused local multipoint distribution system (LMDS) carrier.

U.S. Pat. No. 8,032,025 B2 discloses a system for monitoring polarization detection unit that receives the multiplexed optical signal and measures a polarization state of light received at the optical splitter and a power level of light associated with the RF tone signal. The system further contains a feedback control unit in communication with the optical polarization of the light at the optical splitter to optimize a separation of the first and second data channels for optimal detection. However, this is only a half-duplex polarization multiplexing system. It is related to lull duplex multiplexing system using a reused local multipoint distribution system (LMDS) carrier.

SUMMARY OF INVENTION

The invention provides a system for full-duplex data transmission using polarization multiplexing comprises a central station having a first means for processing downlink signals and a second means for processing uplink signals, and a remote antenna unit connected to the central station via a transmission medium, having a third means for processing downlink signals and a fourth means for processing uplink signals, characterised in that the remote antenna unit is configured to receive downlink signals from the central station, and then to split a portion of the downlink signals to be used as uplink data transmission simultaneously with transmission of the downlink.

Preferably, the first means of the central station includes means for generating at least one wave carrier, means for splitting the generated wave carrier into at least two different polarization states, means for modulating at least one radio frequency signal into at least one of the polarization states, and means for multiplexing the at least two polarization states into the transmission medium.

Preferably, the second means of the central station includes means for splitting multiplexed signals into at least two different polarization states, and means for converting the at least one of the signals into electrical signal.

Preferably, the third means of the remote antenna unit includes means for splitting multiplexed signals into a first and second signals, the first signal is used for downlink transmission and the second signal is re-used for uplink transmission, means for splitting the first and second signals into two polarization states, and means for converting the first signals into electrical signals.

Preferably, the fourth means of the remote antenna unit includes means for modulating at least one radio frequency signal into at least one of the polarization states of the second signal of the third means, and means for multiplexing the at least two polarization states of the second signal into the transmission medium.

Preferably, the transmission medium is a fiber optic cable.

Preferably, the means for generating at least one wave carrier is a Local Multipoint Distribution System Carrier Generator Module.

Preferably, the means for splitting the generated wave carrier into at least two different polarization states is an optical polarization beam splitter.

Preferably, the means for modulating at least one radio frequency signal into at least one of the polarization states is an optical modulator.

Preferably, the means for multiplexing the at least two polarization states into the transmission medium is an optical polarization beam combiner.

Preferably, the means for converting the optical wave signals into electrical signal is a photodetector.

Preferably, the wavelength of the uplink and downlink are the same.

Preferably, each signal is split into carrier with x-polarization and carrier with y-polarization.

Preferably, the third means and the fourth means of the remote antenna unit are coupled with at least one antenna for wireless data transmission.

In one embodiment of the invention, the system may further comprise means at both ends of the transmission medium for guiding the multiplexed signals to their designated path ways. The means for guiding the multiplexed signals to their designated path ways can be an optical circulator.

In another embodiment of the invention, the system may further comprise means for amplifying the signals. The means for amplifying the signals can be optic amplifying module.

One skilled in the art will readily appreciate that the invention is well adapted to carry out the objects and obtain the ends and advantages mentioned, as well as those inherent therein. The embodiments described herein are not intended as limitations on the scope of the invention.

BRIEF DESCRIPTION OF THE DRAWINGS

For the purpose of facilitating an understanding of the invention, there is illustrated in the accompanying drawing the preferred embodiments from an inspection of which when considered in connection with the following description, the invention, its construction and operation and many of its advantages would be readily understood and appreciated.

DETAILED DESCRIPTION OF THE INVENTION

The invention will now be described in greater detail, by way of example, with reference to the drawings.

Figure 1:
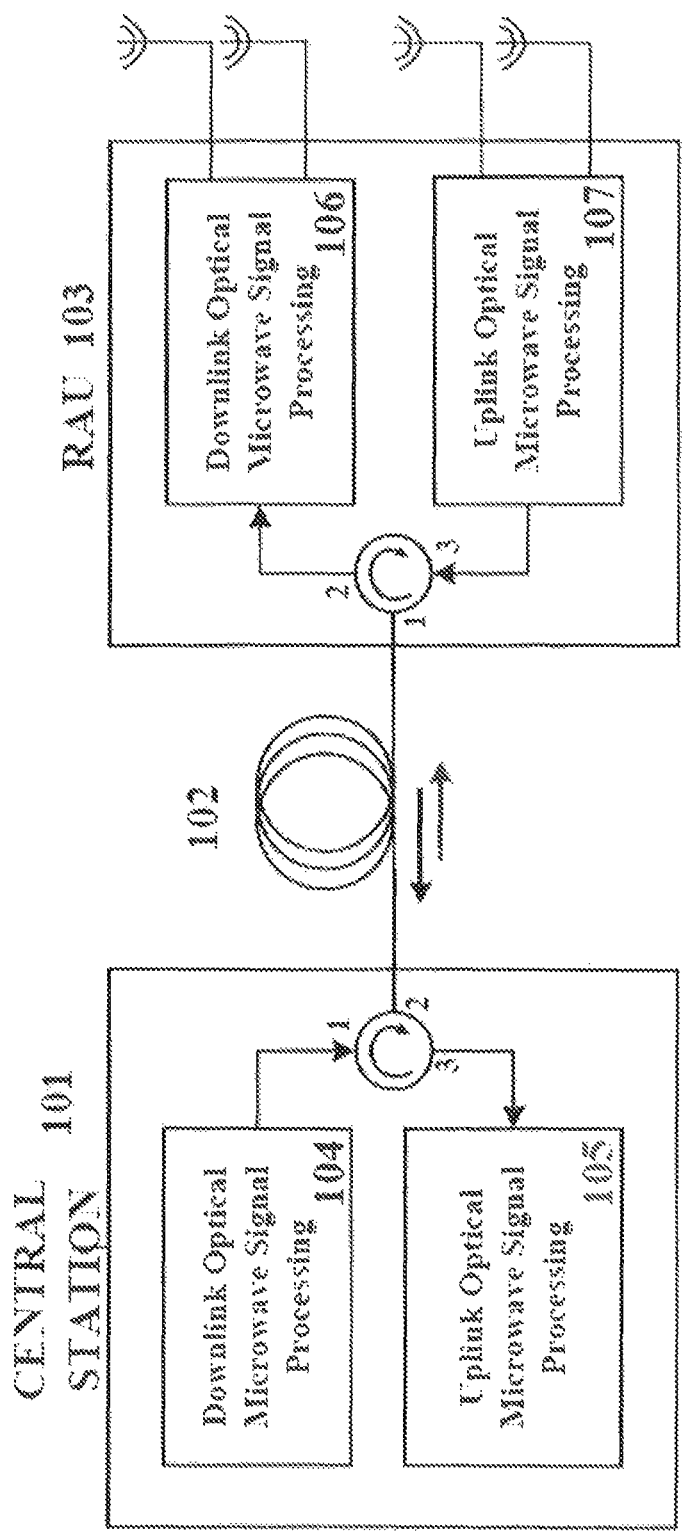
FIG. 1 illustrates a general full-duplex polarization multiplexing (Pol-Mux) system covering central station (CS) and remote antenna unit (RAU).
Figure 2:
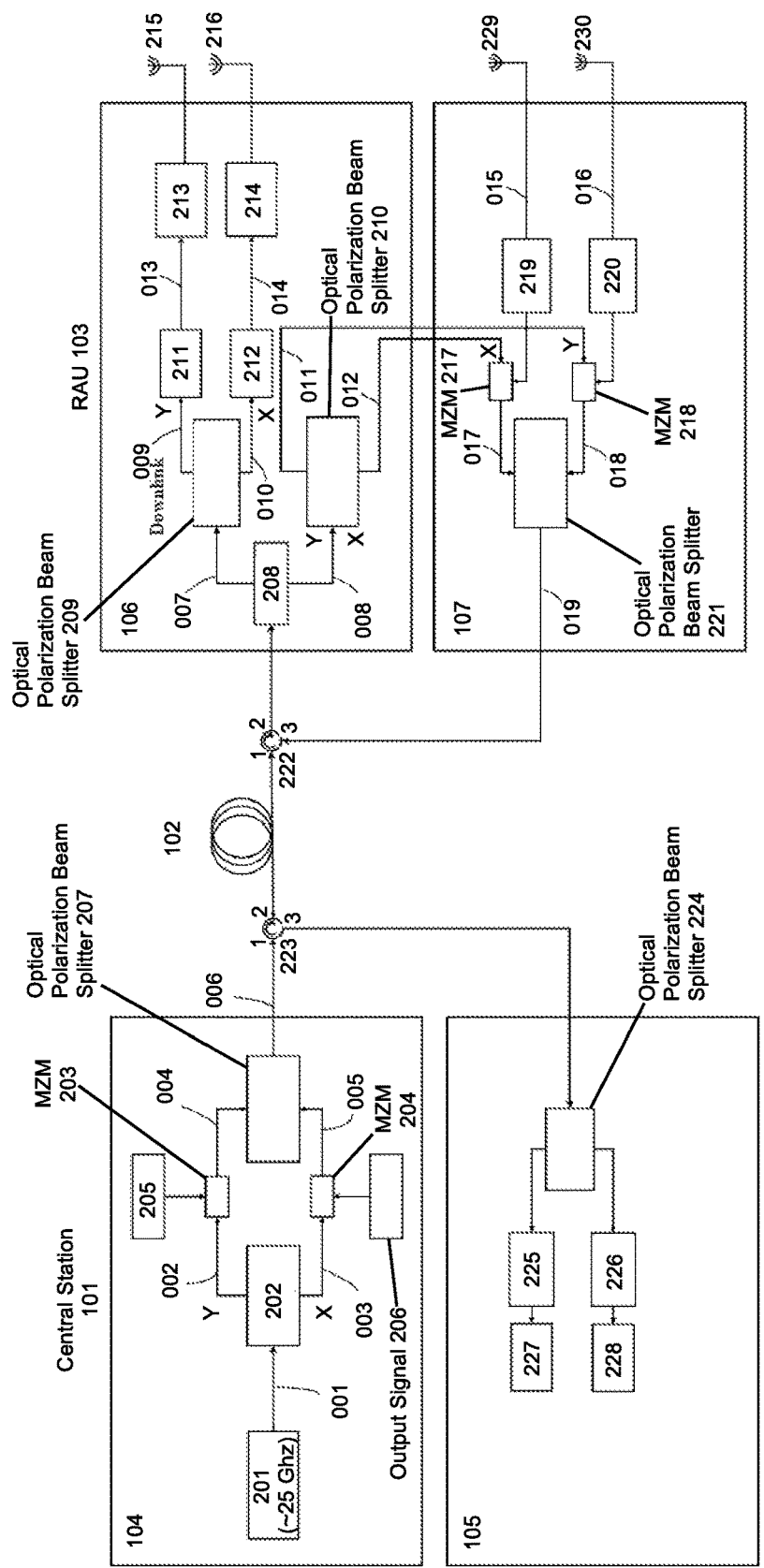
FIG. 2 illustrates the detail of the full-duplex Pol-Mux system.

FIG. 1 and FIG. 2 show an exemplary embodiment of a full-duplex Pol-Mux system. The system comprises a CS 101, a RAU 103 linked to the CS 101 via a transmission medium 102, and a circulator 222, 223 at both end of the cable to guide the optical signal for downlink and uplink at their respective path. The transmission medium 102 can be fiber optic cable, glass conduit, waveguide, light frequency transmission line or even natural interface such as vacuum, liquid, or gas. Preferably, the transmission medium 102 is a single mode fiber.

The CS 101 includes a downlink optical microwave signal processing unit 104 and an uplink optical microwave signal processing unit 105.

Preferably, the downlink optical microwave signal process unit 104 of CS 101 comprises:
i. a local multipoint distribution system (LAMS) carrier generator module 201 for generating high frequency millimeter wave carrier;
ii. an optical polarization beam splitter (PBS) 202 for splitting the LMDS optical carrier into two different states of polarization (SOP), which is x-SOP and y-SOP, the x-SOP is LMDS optical carrier with x-polarization 003, while y-SOP is LMDS optical carrier with y-polarization 002;
iii. two optical modulators 203, 204 for modulating RF signals from different sources with x-SOP and y-SOP optical carrier; the modulated optical signals A, $f_A$ is RF signal A, $f_A$ 205 mixed with the y-SOP LMDS optical carrier; while the modulated optical signals B, $f_B$ is RF signal B, $f_B$ 206 mixed with the x-SOP LMDS optical carrier; and
iv. an optical polarization beam combiner (PBC) for multiplexing the modulated optical signal A, $f_A$ and the modulated optical signal B, $f_B$ into a single fiber medium of the fiber optic cable 102.

Preferably, the uplink optical microwave signal processing unit 105 comprises:
i. a PBS 224 for splitting the uplink signal from the RAU 103 into the two different states of polarization (SOP);
ii. two optic amplifying modules 225, 226 for amplifying the polarised uplink signals; and
iii. two photodetectors 227, 228 for converting the amplified and polarised uplink signals into electrical signals.

The RAU 103 includes a downlink optical microwave signal processing unit 106 and an uplink optical microwave signal processing unit 107.

Preferably, the optical microwave signal processing unit 106 of RAU 103 includes an optical splitter 208 for splitting the multiplexed optical signal from the CS 101 into two-routes; the first route is for downlink and the second route is for uplink. The first route comprises:
i. a PBS 209 for splitting the received signal into x-SOP signal and y-SOP signal;
ii. two photodetectors 211, 212 for converting the two signals into electrical signals;
iii. two RF amplifying modules 213, 214 for amplifying the respective signal in electrical domain; and
iv. two RF antennas 215, 216 used to convert the RF signals before transmitting wireless into the air.

The second route comprises:
i. a PBS 210 for splitting the received signal into x-SOP signal and y-SOP signal where y-SOP is up-converted of RP signal A, $f_A$ at LMDS carrier and x-SOP is up-converted of RF signal B, $f_B$ at LMDS carrier, the two signals is directed to the uplink optical microwave signal processing unit 107.

The uplink optical microwave signal processing unit comprises:

ii. two antennas 229, 230, for receiving the up-converted RF signal A, $f_A$ and up-converted RF signal B, $f_B$ from the air;

iii. two RF amplifying module 219, 220 for amplifying the up-converted RF signal A, $F_A$ and up-converted RF signal B, $f_B$; a band pass filter at the desired band can be inserted between the antennas 229, 230, and the amplifier 219, 220, to filter out unwanted signal;

iv. two optical modulators 217, 218 to modulate the up-converted RF signals, $f_A$ with up-converted of RF signal A, $f_A$, and up-converted of RF signal B, $f_B$ at LMDS carrier;

v. a PBC 221 to multiplex the modulated uplink at x-SOP, and modulate uplink at y-SOP into the fiber optic cable.

Figure 3:
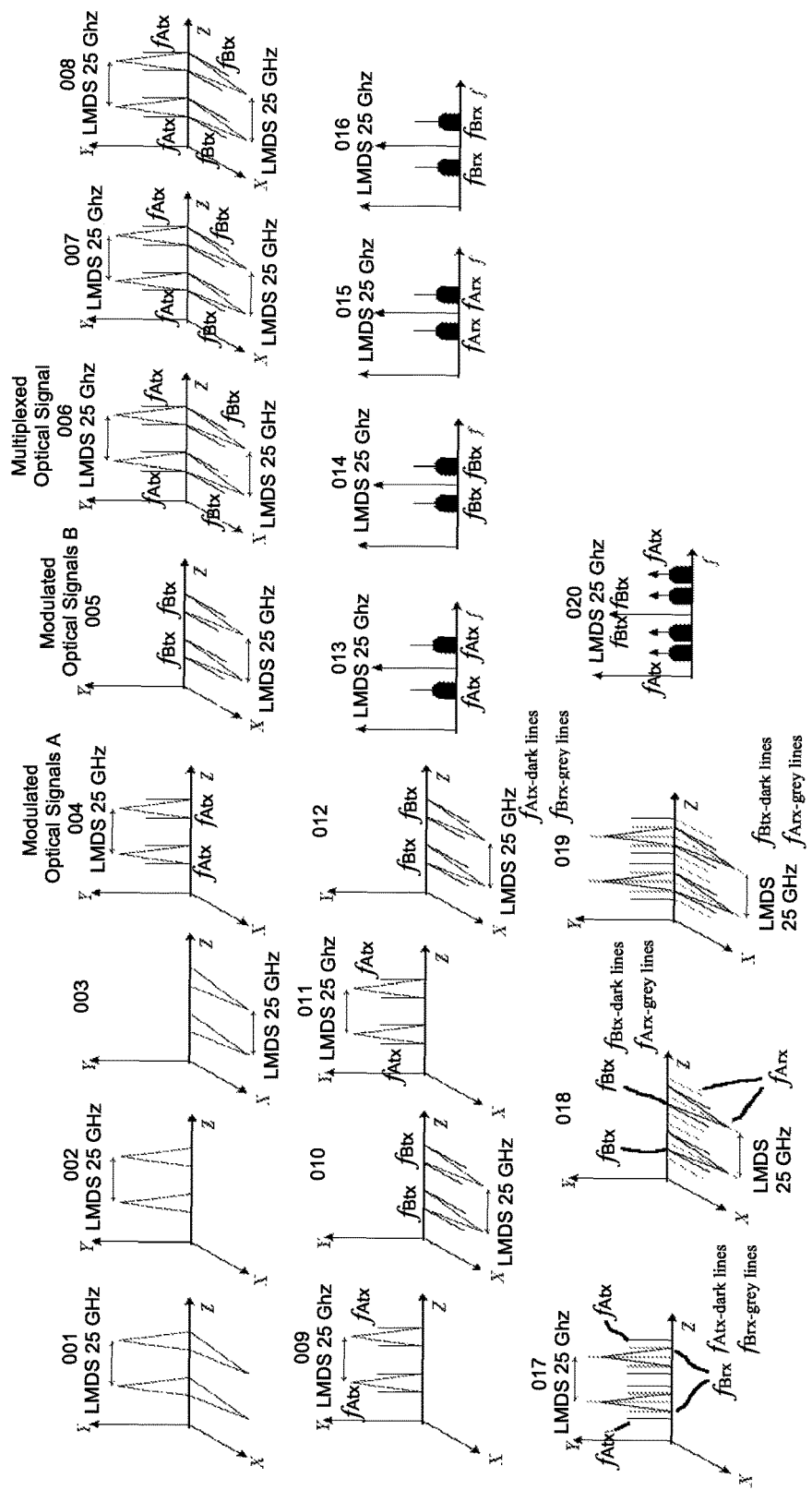
FIG. 3 illustrates the optical domain and electrical domain representation of the x-SOP and y-SOP configuration for the downlink and uplink transmission.
Figure 4:
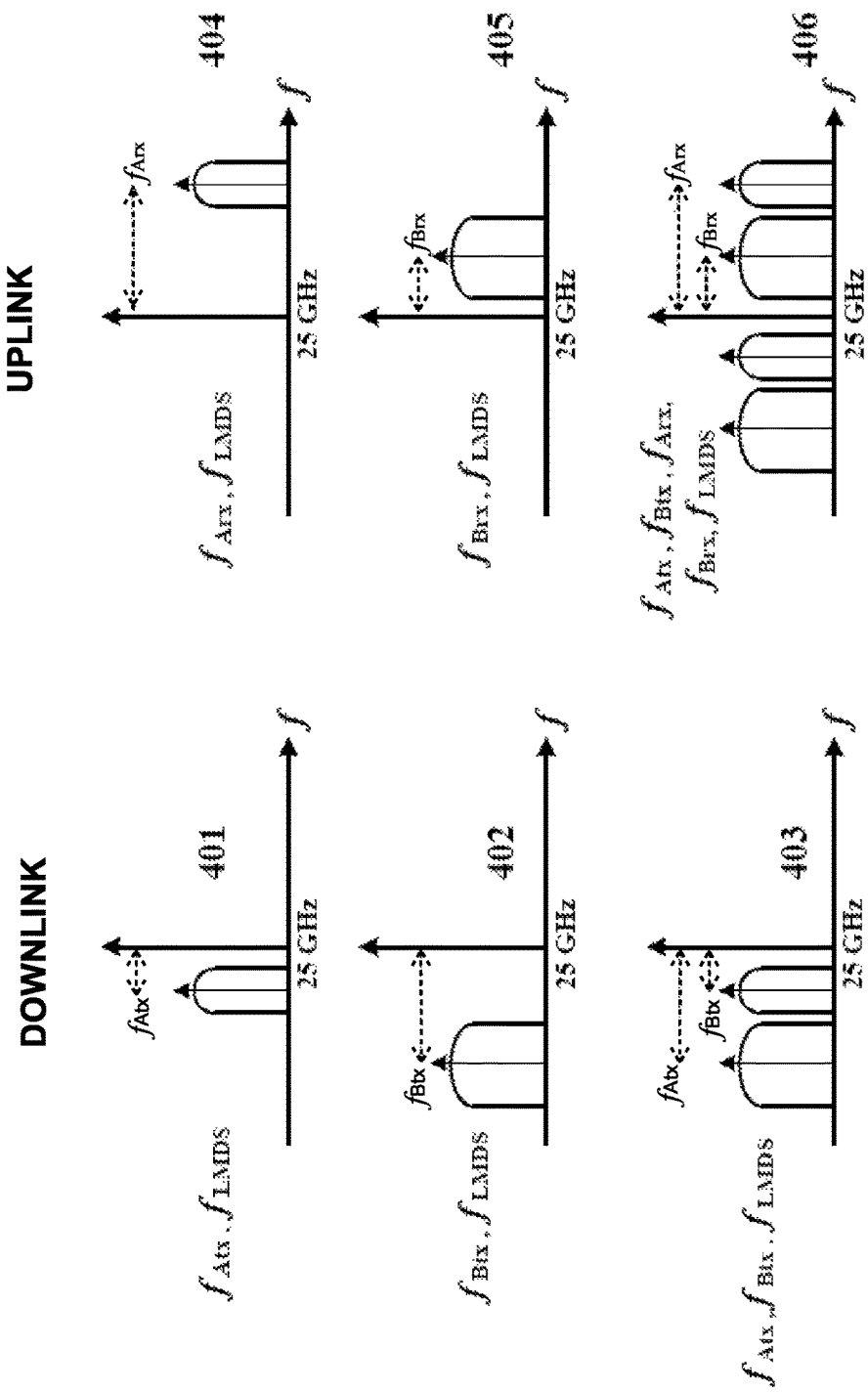
FIG. 4 illustrates the process for transmitting and receiving radio frequency (RF) signal in RF domain depending on the antenna arrangement.
Figure 5:
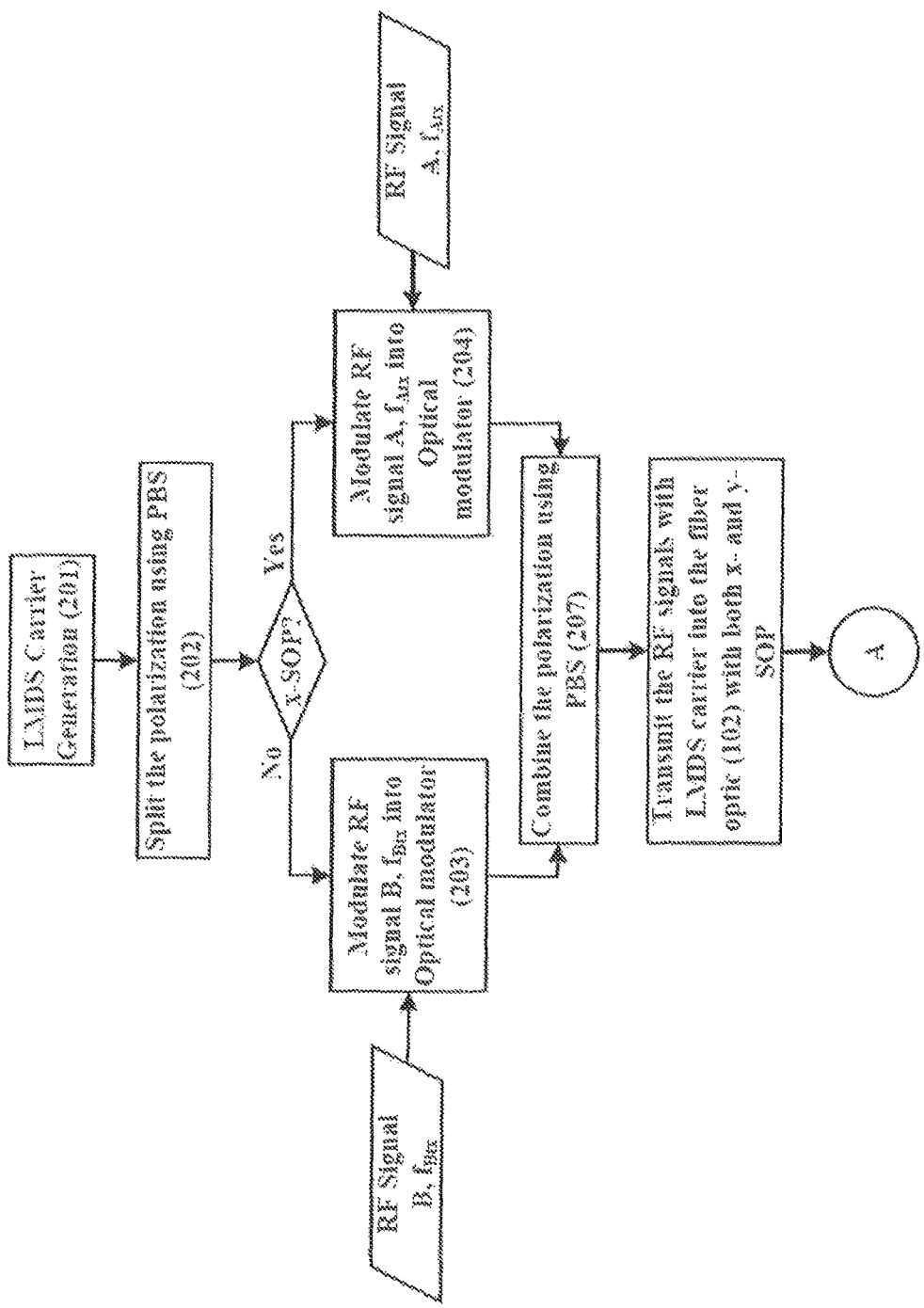
FIG. 5 is a flow chart diagram illustrating the downlink signal processing process of the CS.

The output of signal processed by each modules of the system is illustrated in FIG. 3 as follows:

001 is the LMDS 25 GHz carrier generated from the OCS;

002 is the LMDS optical carrier with y-polarization (y-SOP);

003 is the LMDS optical carrier with x-polarization (x-SOP);

004 is RF signal A, $f_A$ mixed with y-SOP LMDS optical carrier;

005 is RF signal B, $f_B$ mixed with x-SOP LMDS optical carrier;

006 is multiplexed optical signal, consist of RF signal A, $f_A$ mixed with y-SOP LMDS optical carrier, 004 and RF signal B, $f_B$ mixed with x-SOP LMDS optical carrier, 005;

007 is the downlink multiplexed optical signal 006 with reduced power splitted by optical splitter;

008 is the downlink multiplexed optical signal 006 with reduced power splitted by optical splitter 208 to be used as uplink reuse LMDS carrier;

009 is the up-converted of RF signal A, $f_A$ at LMDS carrier at y-SOP;

010 is the up-converted of RF signal B, $f_B$ at LMDS carrier at x-SOP;

011 is similar to 009 and to be used as uplink reuse LMDS carrier;

012 is similar to 010 and to be used as uplink reuse LMDS carrier;

013 is 009 after converted into electrical signal via the photodetector 211;

014 is 010 after converted into electrical signal via the photodetector 212;

015 is the received signal A, $f_A$ with LMDS electrical carrier from antenna 229;

016 is the received signal B, $f_B$ with LMDS electrical carrier from antenna 230;

017 is the 011 from the reuse downlink signal with RF signals A, $f_A$ combined with received signal B, $f_B$ with LMDS electrical carrier 016, the black lines represent the reuse downlink signal with RF signals A, $f_A$, 011;

018 is the 012 from the reuse downlink signal and RF signals B, $f_B$ combine with received signal A, $f_A$ with LMDS electrical carrier 015 from the receiving antenna 230; grey lines represent received signal A, $f_A$ with LMDS electrical carrier 015, while black lines represent the reuse downlink signal and RF signals B, $f_B$ 012;

019 is the multiplexed optical signal for uplink consists of 017 and 018 by the PBC 221 into the fiber optic 102; grey lines represent the received signals from antenna while back lines represent the reuse downlink signals;

020 is the RF signal A, $f_A$ and RF signal B, $f_B$ mixed with LMDS electrical carrier in the air;

FIG. 4 represents the way to transmit and to receive the RF signal in RF domain depending on the antenna arrangement; where;

401 is an up-converted RF signal A, fA, at LMDS frequency band, before transmitting to the air by transmitter antenna 215; 401 can be represented by 013 of FIG. 3;

402 is an up-converted RF signal B, fB at LMDS frequency band, before transmitting to the air by transmitter antenna 216; 402 can be represented by 014 of FIG. 3;

403 is an up-converted RF signal A, fA and RF signal B, fB in the air transmission medium; 403 can be represented by 020 of FIG. 3;

404 is an up-converted RF signal A, fA, at LMDS frequency band at receiving antenna 229; 404 can be represented by 015 of FIG. 3;

405 is an up-converted RF signal B, fB at LMDS frequency band at receiving antenna 230; 405 can be represented by 016 of FIG. 3;

406 is an up-converted RF signal A, fA and RF signal B, fB at LMDS frequency band in the fiber upon uplink transmission as multiplexed optical signal for uplink; 406 can be represented by 019 of FIG. 3;

FIG. 5 illustrates the signal transmission in the downlink optical microwave signal processing unit 104 of CS 101. In the first step, the LMDS optical carrier 001 is generated by using a technique called optical carrier suppression (OCS). In the second step, the LMDS optical carrier 001 from the OCS is split into two signals with different state of polarization, y-SOP 002 and x-SOP 003 by using the PBS 202. In the third step, the RF signal A, $f_A$ 205 is mixed with y-SOP by optical modulator 203, and the RF signal B, $f_B$ 206 is mixed with x-SOP by optical modulator 204. In the fourth step, the RF signal A, $f_A$ mixed with y-SOP LMDS optical carrier 004 and RF signal B, $f_B$ mixed with x-SOP LMDS optical carrier 005 are combined or multiplexed into the single fiber optic cable medium but at different polarization axis by using PBC 207, the multiplexed signals are transmitted to the RAU.

Figure 6:
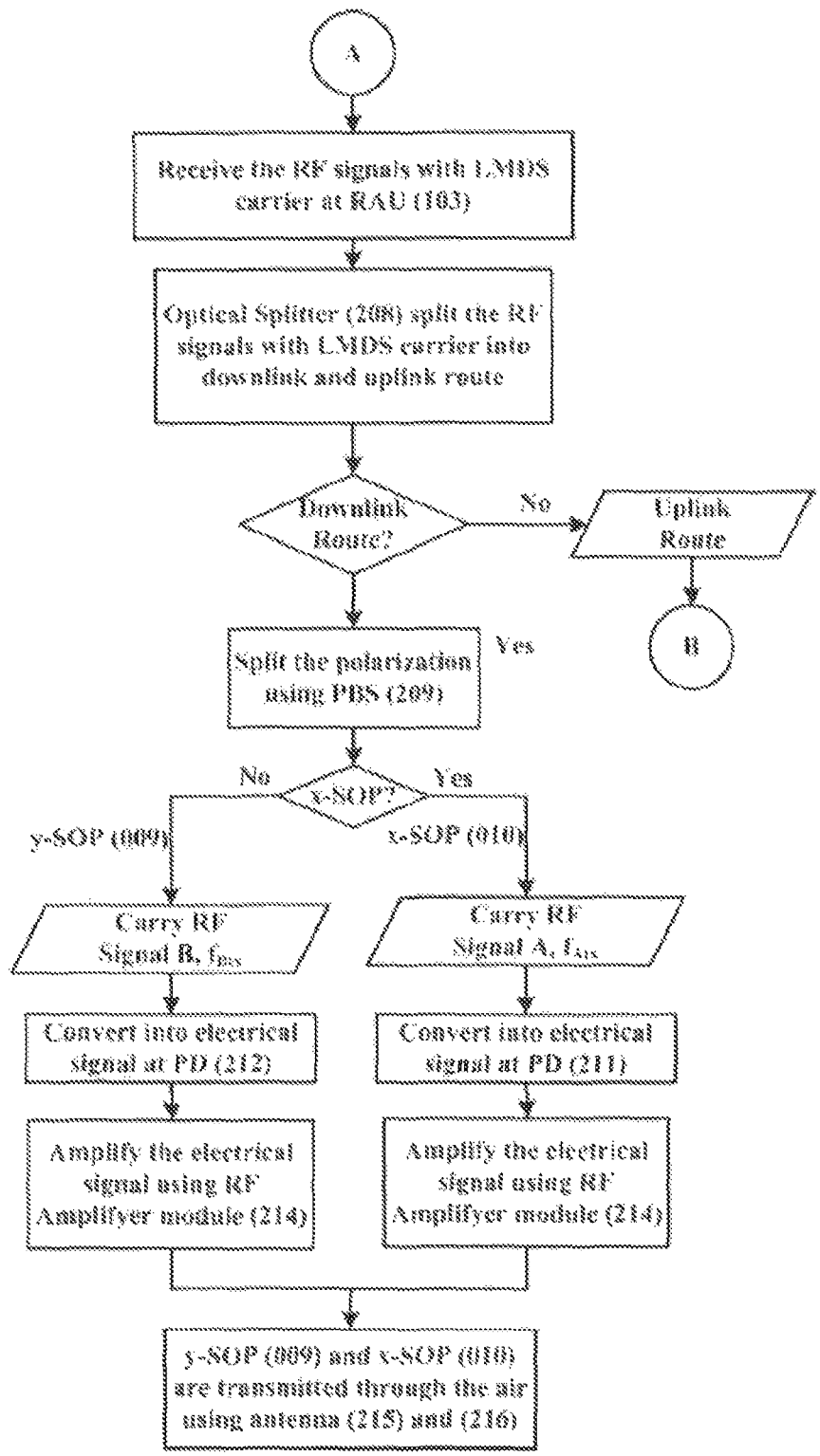
FIG. 6 is a flowchart diagram illustrating the downlink signal processing process of the RAU.

FIG. 6 illustrates the signal transmission in the downlink optical microwave signal processing unit 106 of RAU 103. Upon the multiplexed signal 006 reaches the RAU 103, the optical splitter 208 split the optical signal into two different routes at any splitting ratio depending on the signal link budget. At the first route, the multiplexed optical signal is split back into their polarized signals x-SOP 010 and y-SOP 009 using PBS 209. In the third step, these polarized signals are converted by their respective photodetectors 211, 212 into RF signal A, $f_A$ 013 and RF signal B, $f_B$ 014 which were carried by LADS carrier. In the fourth step, the RF signals 013, 014 are amplified respectively by the RF amplifying modules 213, 214. In the final step, the amplified RF signals 013, 014 are transmitted through air (wirelessly) represented by 020 at respective frequency with no overlapping of spectrum via antennas 215, 216.

Figure 7:
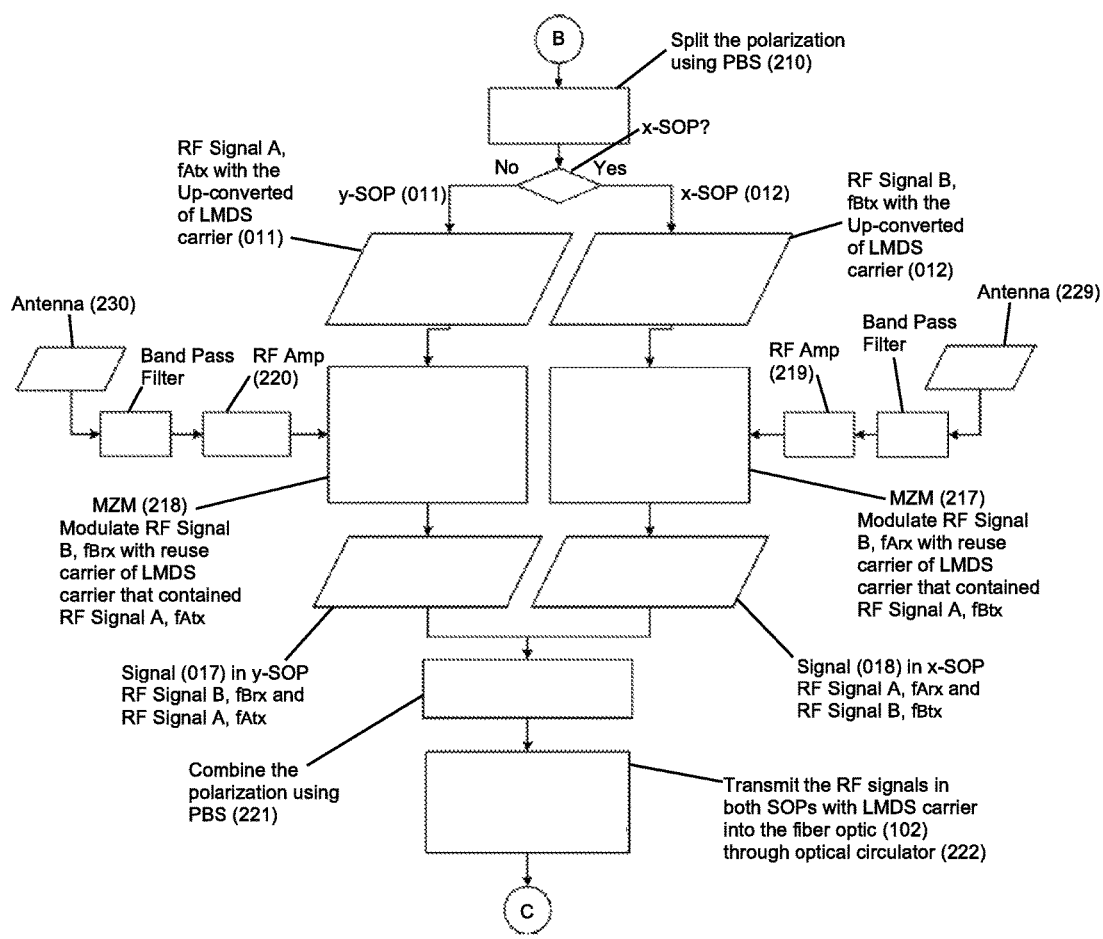
FIG. 7 is a flow chart diagram illustrating the uplink signal processing process of the RAU.

FIG. 7 illustrates the signal transmission in the uplink optical microwave signal processing unit 107 of RAU 103. After the optical splitter 208 of the downlink processing unit 106 splits the received signal in two portions, one portion will be reused for the uplink carrier signal transmission. Preferably, the signal is split into two equal power signals 007, 008 by the optical splitter 208. It should be noted that the signal can be divided into different ratio depending on the applications or the business packages provided by the service provider. The Signal 008 is split again by PBS 210, into y-SOP and x-SOP signal where x-SOP is up-converted of RF signal B, $f_B$ at LMDS carrier 012, and y-SOP is up-converted of RF signal A, $f_A$ at LMDS carrier 011 respectively. The RF signal A, $f_A$ 015 and the RF signal B, $f_B$ 016 are signals which received from the antenna 229, 230 and being amplified by RF amplifying modules 219, 220. In one embodiment, the band pass filter at the desired band is inserted between antennas 229, 230 and amplifiers 219, 220 to filter out unwanted signal. The received RF signals A, $f_A$ 015, is then modulated with the LMDS carrier at x-SOP containing RF signals B, $f_B$ 012, and the received RF signal B, $f_B$ 016 is modulated with LMDS carrier at y-SOP 012 containing RF signals A, $f_A$ 011 by using optical modulators 217, 218. Thus, for the uplink transmission, the reuse downlink signal RF signal B, $f_B$ at LMDS carrier at x-SOP 012 with the received signal A, $f_A$ 015 with LMDS electrical carrier from antenna 229 is hereinafter referred to as modulated uplink at x-SOP 018; the reuse downlink signal RF signal A, $f_A$ at LMDS carrier at y-SOP 011 with the received signal B, $f_B$ 016 with LMDS electrical carrier from antenna 230 is hereinafter referred to as modulated uplink at y-SOP 017. The modulated uplink at y-SOP and modulated uplink at x-SOP 018 are then combined at the PBS 221 and multiplexed back into the fiber optic cable 102 via a circulator 222 as uplink transmission. The received signals from the antennas 229, 230 will not interfere with signals in the LMDS carrier due to different polarization and frequency allocation.

Figure 8:
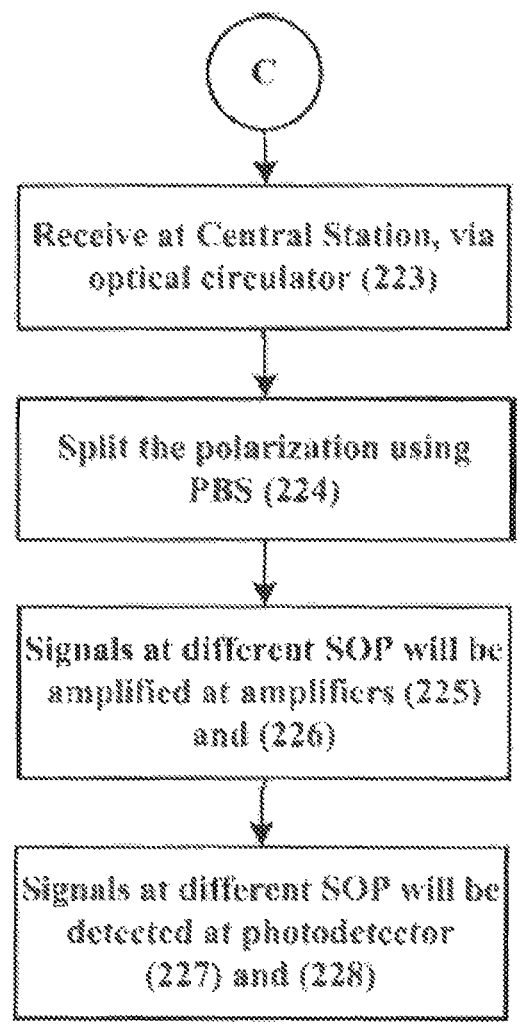
FIG. 8 is a flow chart diagram illustrating the uplink signal processing process of the CS.

FIG. 8 illustrates the signal transmission in the uplink optical microwave signal processing unit 105 of CS 101. The multiplexed optical signal from the RAU 103 is split back into their polarised signals x-SOP and y-SOP using PBS 224. These polarised signals are then amplified using optic amplifying modules 225, 226. Finally, the amplified and polarised signals are converted to electrical signals by their respective photodetectors 227, 228.

The present disclosure includes as contained in the appended claims, as well as that of the foregoing description. Although this invention has been described in its preferred form with a degree of particularity, it is understood that the present disclosure of the preferred form has been made only by way of example and that numerous changes in the details of construction and the combination and arrangements of parts may be resorted to without departing from the scope of the invention.

The invention claimed is:

1. A system for full-duplex data transmission using polarization multiplexing comprising:
   a central station having a first means for processing downlink signals and a second means for processing uplink signals; and
   a remote antenna unit connected to the central station via a transmission medium, having a third means for processing downlink signals and a fourth means for processing uplink signals,
   characterised in that the remote antenna unit is configured to receive downlink signals from the central station, and then to split a portion of the downlink signals to be used as uplink data transmission simultaneously with transmission of the downlink;
   wherein the first means of the central station includes:
      means for generating at least one wave carrier,
      means for splitting the generated wave carrier into at least two different polarization states,
      means for modulating at least one radio frequency signal into at least one of the polarization states, and
      means for multiplexing the at least two polarization states into the transmission medium; and
   wherein the second means of the central station includes:
      means for splitting multiplexed signals into at least two different polarization states, and
      means for converting the at least one of the signals into electrical signal; and
   wherein the third means of the remote antenna unit includes:
      means for splitting multiplexed signals into a first and second signals, the first signal is used for downlink transmission and the second signal is reused for uplink transmission,
      means for splitting the first and second signals into two polarization states, and
      means for converting the first signals into electrical signals, and
   wherein the fourth means of the remote antenna unit includes:
      means for modulating at least one radio frequency signal into at least one of the polarization states of the second signal of the third means, and
      means for multiplexing the at least two polarization states of the second signal into the transmission medium.

2. The system according to claim 1, further comprising means at both ends of the transmission medium for guiding the multiplexed signals to their designated path ways.

3. The system according to claim 2, wherein the means for guiding the multiplexed signals to their designated path ways is an optical circulator.

4. The system according to claim 1, further comprising means for amplifying the signals.

5. The system according to claim 1, wherein the third means and the fourth means of the remote antenna unit are coupled with at least one antenna for wireless data transmission.

6. The system according to claim 1, wherein the transmission medium is a fiber optic cable.

7. The system according to claim 1, wherein the means for generating at least one wave carrier is a Local Multipoint Distribution System (LMDS) Carrier Generator Module.

8. The system according to claim 1, wherein the means for splitting the generated wave carrier into at least two different polarization states is an optical polarization beam splitter.

9. The system according, to claim 1, wherein the means for modulating at least one radio frequency signal into at least one of the polarization states is an optical modulator.

10. The system according to claim 1, wherein the means for multiplexing the at least two polarization states into the transmission medium is an optical polarization beam combiner.

11. The system according to claim 1, wherein the means for converting the optical wave signals into electrical signal is a photodetector.

12. The system according to claim 1, wherein the wavelength of the uplink transmission and downlink transmission is the same.

13. The system according to claim 1, wherein each signal is split into carrier with x-polarization and carrier with y-polarization.

14. The system according to claim 1, wherein the radio frequency signal contained within the second signal is arranged in a way such that it avoids overlapping with the radio frequency signals received from the antennas.

15. The system according to claim 14, wherein the signal arranging process for a reuse LMDS carrier containing radio frequency signal at y-SOP includes the steps of:

selecting a frequency different from the radio frequency signal of the DADS carrier for the radio frequency signal from the antenna so that the two radio frequency signals do not overlap with each other; and modulating, by the optical modulator, the radio frequency signal from the antenna into y-SOP of the of the LMDS carrier so that the two radio frequency signals are at y-SOP before transmitting back to the central station.

16. The system according to claim 14, wherein the signal arranging process for a reuse LMDS carrier containing radio frequency signal at x-SOP includes the steps of:

selecting a frequency different from the radio frequency signal of the LMDS carrier for the radio frequency signal from the antenna so that the two radio frequency signals do not overlap with each other; and modulating, by the optical modulator, the radio frequency signal from the antenna into y-SOP of the of the LMDS carrier so that the two radio frequency signals are at y-SOP before transmitting back to the central station.

17. The system according to claim 1, wherein the system only operates with a polarization multiplexing apparatus.

18. The system according to claim 17, wherein the polarization multiplexing apparatus uses the same transmission medium for both uplink and downlink transmission.

19. The system according to claim 1, wherein unused or unwanted signals contained within the second signal is configured not to overlap with signals from the antennas so that radio frequency filter is no longer needed.

20. The system according to claim 1, wherein the system is configured to reuse a portion of the downlink signal as uplink transmission so that carrier generator such as laser at the remote antenna unit is no longer needed.

21. The system according to claim 1, wherein the system is configured to convert the radio frequency signals from the remote antenna unit at the central station and to directly modulate the incoming radio frequency signals from the antennas with the second signal so that radio frequency oscillator and/or radio frequency mixer are no longer needed.

* * * * *